April 5, 1949.　　　　C. A. LUNDEEN　　　　2,466,032
PIPE TONG HAVING MEANS FOR DISTRIBUTING
PRESSURE BETWEEN THE JAWS
Filed Aug. 21, 1945　　　　2 Sheets-Sheet 1
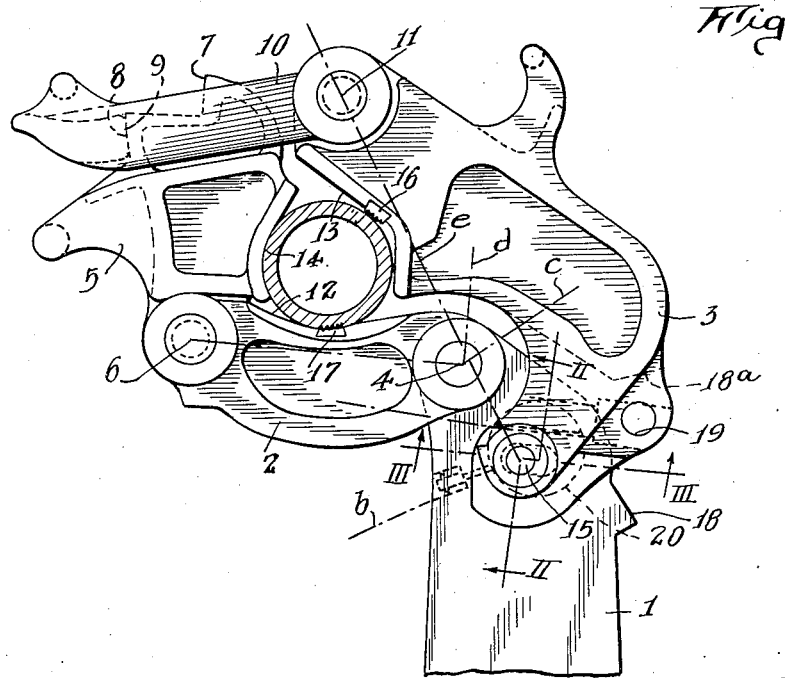
Fig. 1
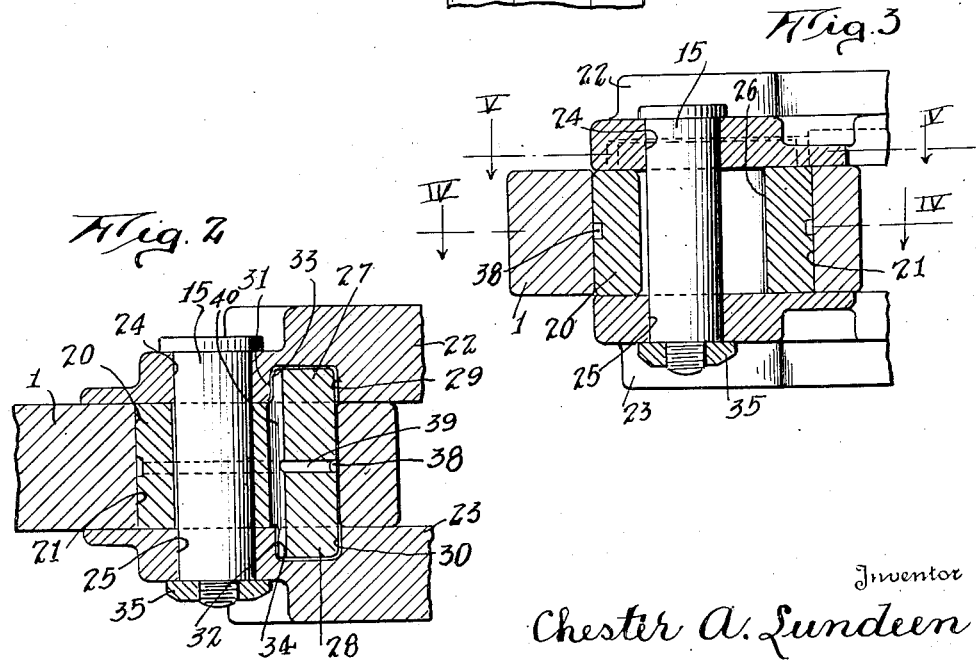
Fig. 3
Fig. 2
Inventor
Chester A. Lundeen
By Lyon & Lyon
Attorneys Inventor
Chester A. Lundeen
By Lyon & Lyon
Attorneys Patented Apr. 5, 1949

2,466,032

UNITED STATES PATENT OFFICE 2,466,032

PIPE TONG HAVING MEANS FOR DISTRIBUTING PRESSURE BETWEEN THE JAWS

Chester A. Lundeen, Los Angeles, Calif., assignor to Byron Jackson Co., Vernon, Calif., a corporation of Delaware Application August 21, 1945, Serial No. 611,823

6 Claims. (Cl. 81—66)

This invention relates generally to pipe tongs, and particularly to tongs such as are used for making up and breaking out the joints between drill pipe and casing used in oil well drilling operations.

The invention has particular utility in drill pipe and casing tongs which are capable of adjustment to accommodate a wide range of drill pipe and casing sizes. Tongs which are adapted to be used on only a single size of pipe, or on two closely related sizes, may be constructed so that surface contact over a wide area may be provided between the tong jaws and the pipe, and the radially inward pressure exerted by the jaws may thus be distributed so as to avoid crushing or crimping the pipe. Also, in such tongs the relative positions of the various jaw pivots may be so arranged that sufficient pressure is applied by the heel jaw to avoid slipping of the tong around the pipe. A necessarily inherent characteristic of a wide range multi-jaw tong, however, is that the jaws engage the pipe only at a few circumferentially spaced points, resulting in the radial pressure being concentrated at these points. In a double-fulcrum tong wherein a pair of opposed jaws are connected to a lever at spaced apart pivot points, considerably greater pressure is applied to the pipe by the jaw whose pivotal connection with the lever is farthest from the pipe axis, because of the longer lever arm through which the pressure is applied. The application of pressure to the pipe at only a few spaced points, coupled with a pronounced disparity in the distribution of the pressure between the contact points, may result in crimping of the pipe at the point of maximum pressure.

It is an important object of this invention to provide a pipe tong wherein the radial pressure exerted by the tong jaws against the pipe is more uniformly distributed than in tongs previously known and used.

It is a further object of this invention to provide a pipe tong wherein the distribution of pressure between the contact points is effected automatically by means of a self-adjusting connection between at least one of the jaws and the tong lever.

It is a still further object of this invention to provide, in a pipe tong of the double-fulcrum type wherein a pair of opposed jaws are connected to the tong lever at spaced points, a pressure-equalizing arrangement whereby the force applied through the lever to one jaw is resolved into two components, one component applying radial pressure to the pipe through said one jaw, and the other component acting in a direction to urge the other jaw toward the pipe and augmenting the radial pressure exerted by said other jaw.

It is a more specific object of this invention to provide a multi-jaw pipe tong embodying wedge means interposed between one jaw and the tong lever, the wedge means functioning to decrease the pressure exerted by said one jaw against the pipe and to increase the pressure exerted by another jaw against the pipe.

A still further object is to provide a pipe tong as set forth above wherein the wedge angle of the aforementioned wedge means remains constant irrespective of variations in the relative angular positions of the tong lever and the jaw with which the wedge means is associated.

Other objects and advantages will be apparent from the following detailed description of one embodiment of the invention, reference being had to the accompanying drawings wherein:

Figure 1 is a plan view of a pipe tong embodying the invention;

Figure 2 is a vertical sectional view taken on broken section line II—II of Figure 1;

Figure 3 is a vertical sectional view taken on line III—III of Figure 1, at substantially a right angle to Figure 2;

Figure 4:
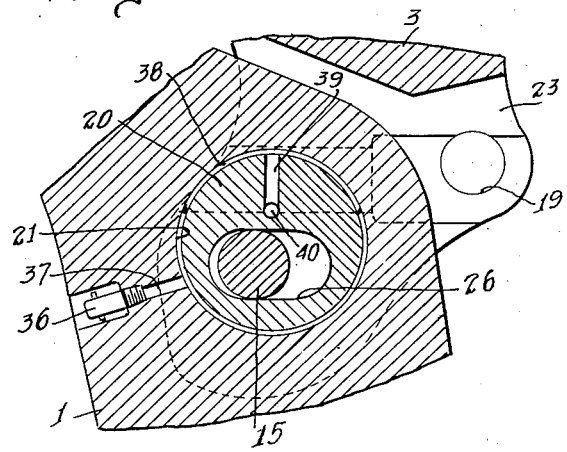
Figure 4 is a horizontal sectional view taken on line IV—IV of Figure 3.

Referring to Figure 1, the invention is shown as embodied in a three-jaw tong, although it will be understood that this is solely for illustrative purposes, and it will become apparent as the description proceeds that the novel features are equally applicable to a tong comprising a greater or lesser number of jaws. In the illustrated embodiment the tong comprises a lever 1, to the inner end of which a pair of jaws 2 and 3 are pivotally connected for swinging movement about spaced apart, parallel axes. The jaw 2 is connected to the lever on a fixed pivot by the pivot pin 4, whereas a sliding pivotal connection is provided between the lever and the jaw 3, the details of which will be described hereinafter. A latch lug jaw 5 is pivotally connected to the outer end of the jaw 2 by a pivot pin 6, and is provided with a pair of latching lugs 7 and 8 adapted to be selectively engaged by a latching surface 9 on a latch 10 pivotally connected at 11 to the outer end of the jaw 3. The jaws 2 and 3 are provided with pipe-engaging surfaces 12 and 13, respectively, adapted to engage pipe of a wide range of sizes, and by the substitution of latch lug jaws 5 of varying lengths the tong may be made to accommodate a wide range of pipe sizes.

Cooperating abutment surfaces 18 and 18a are provided on the lever and the jaw 3 to limit the swinging movement of the jaw in opening direction. When the tong is being used on relatively small sizes of pipe, it is not necessary to swing the jaw open the maximum amount, and hence the jaw is provided with a bore 19 in which a bolt may be inserted, to engage the abutment surface 18 and limit swinging movement of the jaw.

As stated in the introductory remarks, and as apparent from an inspection of Figure 1, in order that the jaws 2 and 3 may be employed on a wide range of pipe sizes, the faces 12 and 13 are necessarily so shaped that they engage the pipe at only one or possibly two points. This also applies to the face 14 of the latch lug jaw 5 and its interchangeable jaws. The entire radial pressure exerted on the pipe by the jaws, when they are constricted by swinging of the lever in a clockwise direction, is thus concentrated at these relatively few contact points. It is thus exceedingly important that the pressures exerted by the individual jaws be equalized as nearly as possible, if crimping of the pipe is to be avoided.

A brief analysis of the distribution of forces applied to a tong such as that shown in Figure 1 will clearly demonstrate that if the jaw 3 were connected to the lever by a fixed pivot, as in the case of the jaw 2, the radial pressure exerted on the pipe by the jaw 3 would greatly exceed that exerted by the jaw 2. Assuming that the tong jaws are constricted about the pipe, the pivot pins 4 and 11 may be considered as fixed fulcrums for the lever and the jaw 3, respectively, when considering the forces acting on the jaw 3. The application of force to the lever tending to swing it in a clockwise direction about pivot pin 4 would, if the pivot pin 15 were mounted on a fixed axis in the lever and the jaw 3, exert a force on the jaw 3 tending to pivot it in a clockwise direction about the pivot pin 11. Owing to the fact that the pins 15, 4 and 11 are nearly aligned, substantially the entire force exerted on the jaw 3 through the pin 15 is exerted in a tangential direction, as indicated by the broken line b in Figure 1, and is therefore effective to exert radial pressure on the pipe at the contact point between the jaw 3 and the pipe, as represented by the die 16. The pressure exerted at the die 16 is equal to the tangential component of the force exerted at the pin 15, multiplied by the ratio of the distances from the pin 11 to the pin 15 and to the die 16, respectively. In the construction shown, this ratio is approximately 4:1.

Similarly, when considering the forces acting on the jaw 2, the pivot pins 6 and 15 may be considered as fixed fulcrums for the jaw 2 and the lever, respectively. The application of force to the lever tending to swing it about the pivot pin 15 as a fulcrum exerts a force on the jaw 2, through the pivot pin 4, in the direction of the broken line c in Figure 1. Owing to the fact, however, that the direction of this force is at an acute angle to a line extending between the pivot pins 6 and 4, the tangential component of this force, acting in the direction of the broken line d in Figure 1, and at a right angle to the line extending between the pivot pins 6 and 4, is relatively small compared to the total force exerted on the pin 4 by the lever. This tangential force, acting in the direction of line d, causes the jaw 2 to exert radial pressure on the pipe at the die 17. Since the die is located approximately midway of the distance between the pivot pins 6 and 4, the pressure exerted on the pipe by the die is approximately twice the above-mentioned tangential force.

It is thus apparent that the pressure exerted on the pipe by the jaw 3 through the die 16 would be several times that exerted by the jaw 2 through the die 17 if the pivot pin 15 were mounted on a fixed axis in the lever and the jaw 3. The novel construction whereby a portion of this pressure is transferred from the jaw 3 to the jaw 2 will now be described.

Referring to Figures 2 to 5 of the drawing, a disk 20 of cylindrical contour is mounted for free rotation in a bore 21 in the lever 1. The major portion of the disk is of a thickness equal to the thickness of the lever in the region of the bore 21, so that the disk may be retained in its bore by the overlying and underlying spaced pivot lugs 22 and 23 formed on the jaw 3 (Figure 2). The pivot pin 15 extends through aligned bores 24 and 25 in the respective lugs 22 and 23, and loosely engages an elongated slot 26 in the disk. Projecting upwardly and downwardly from opposite end faces of the disk 20 are a pair of segmental wedge lugs 27 and 28 which respectively slidably engage slots 29 and 30 formed in the pivot lugs 22 and 23 of the jaw 3. It will be observed that the wedge lugs 27 and 28 are provided with elongated plane surfaces 31 and 32 which are adapted to have wedging engagement with the adjacent side walls 33 and 34 of the respective slots, in a manner set forth hereinafter.

It should be particularly noted that the clearances between the pivot pin 15 and the bores 24 and 25, and between the wedge surfaces 31 and 32 and the adjacent side walls 33 and 34 of the slots 29 and 30, are preferably such that the force is transferred from the lever to the jaw 3 through the intermediacy of the disk 20, the wedge surfaces 31 and 32 and the side walls 33 and 34, rather than through pressure engagement of the pivot pin 15 with the wall of the pin slot 26. Thus the pin 15 serves only as a retaining member by limiting sliding movement of the jaw 3 relative to the disk 20, and is not subjected to shear or bending stresses. The pin 15 is preferably, although not necessarily, provided with a retaining nut 35, and in that event the pin serves as a tie member between the pivot lugs 22 and 23 and prevents spreading of them under load.

It is very desirable that the wedge surfaces 31, 32, 33 and 34, and the walls of the disk 20 and its bore 21, be lubricated in order to maintain the sliding friction therebetween at a minimum. Lubricant is introduced through a fitting 36 mounted in a suitable recess in the lever 1 (Figure 4) and communicating through a passage 37 with the disk bore 21 therein. A circumferential groove 38 is formed in the periphery of the disk 20 in communication with the passage 37, to distribute lubricant about the periphery of the disk and also to deliver it to a radial passage 39 in the disk. The passage 39 intersects a vertical passage 40 (Figure 2) communicating with the wedge surfaces 31 and 32 on the wedge lugs 27 and 28. In this manner both the cylindrical surface of the disk and the wedge surfaces 31 and 32 are lubricated from a common source.

It will be apparent from the foregoing description of the sliding and pivotal connection between the lever 1 and the jaw 3 that the direction of sliding movement of the jaw relative to the lever and the disk 20 is fixed with respect to the jaw. As the jaw 3 and the lever assume different angularly related positions, the disk 20 is constrained to pivot with the jaw about the axis of the disk, because of the engagement of the cooperating wedge surfaces 31, 32, 33 and 34. As will be apparent from the following force analysis, this arrangement results in a decrease in the amount of pressure transferred from the jaw 3 to the jaw 2 as the lever is moved into positions wherein increased pressure is applied directly to the jaw 2 by the lever. In this manner, the relative amounts of pressure applied to the pipe by the jaws 2 and 3 are maintained substantially uniformly irrespective of the position of the lever as the tong is applied to different sizes of pipe.

Figure 5:
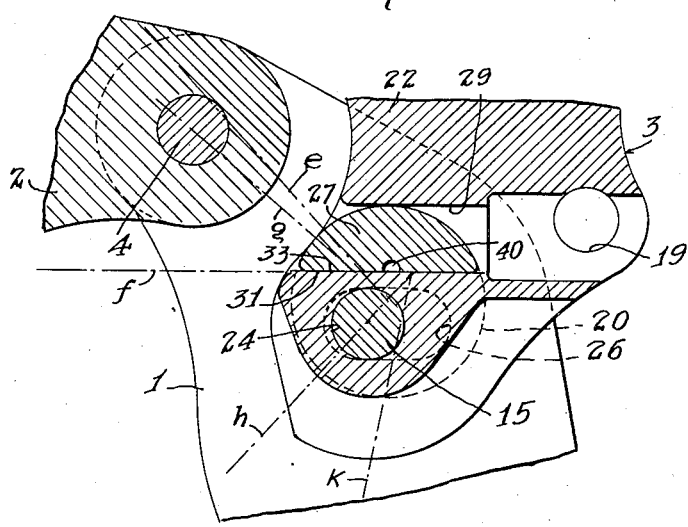
Figure 5 is a horizontal sectional view taken on line V—V of Figure 3.

Referring particularly to Figure 5 of the drawing, swinging of the lever about the axis of pivot pin 4 applies a force to the jaw 3 in the direction of the broken line $h$, perpendicular to the line $g$ extending through the axes of the pivot pin 4 and the disk 20. This force is exerted on the jaw 3 through pressure engagement of the wedge surfaces 31 and 32 on the disk 20, with the cooperating surfaces 33 and 34 on the jaw 3. Sliding movement of the disk along the slot 29 is opposed by a reaction force set up in the lever, acting along the line $g$, and by a frictional force. The resultant of these three forces—the primary force acting in the direction of the line $h$, the reaction force acting along the line $g$ from the pin 4 to the disk 20, and the frictional force—is a force acting approximately in the direction of the line $k$. The force acting along the line $g$ represents the force transferred from the jaw 3 to the jaw 2 by reason of the sliding disk construction, and this force augments that acting on the jaw 2 by swinging of the lever about the axis of the disk 20. Assuming that a given force is applied to the outer end of the lever, the magnitude of the force acting in the direction of the line $h$ will be constant irrespective of the angular position of the lever, but the direction of the line $h$ will change, being always at right angles to the line $g$ extending between the axes of the pivot pin 4 and the disk 20. As the lever assumes different positions to the right of that shown, the line $h$ approaches line $k$, and consequently the magnitude of the reaction force acting along the line $g$ is reduced; in other words, the force transferred from the jaw 3 to the jaw 2 is less when the lever is farther to the right than the position shown. However, when the lever is moved to the right the line $c$ (Figure 1) approaches line $d$, and a greater component of the force applied directly to the jaw 2 by the lever is exerted in the direction of the line $d$, resulting in the application of greater pressure to the pipe by the jaw 2. Hence a lesser force is required to be transferred from the jaw 3 to the jaw 2 in order to equalize the pressures applied to the pipe by the respective jaws.

It is thus seen that the sliding disk construction described herein effects transfer from the jaw 3 to the jaw 2 of a force which varies in magnitude inversely with the magnitude of the force exerted directly on the jaw 2 by the lever, whereby the total pressure applied to the pipe by the jaw 2 is maintained approximately equal to that applied to the pipe jaw 3, irrespective of the angular position of the lever. It will be understood that the magnitude of the resultant force acting on the jaw 3 in the direction of the line $k$ decreases slightly as the lever assumes different angular positions to the right of that shown. It will also be understood that the ideal condition of exactly equalized radial pressure exerted on the pipe by the jaws 2 and 3 cannot be attained in practice over a wide range of pipe sizes. However, this condition can be approached closely enough so that the pressure is distributed in a manner to avoid damaging the pipe by crimping.

In the present instance it will be noted that the wedge lugs 27 and 28 are disposed at one side of the disk 20, and the center line of the pin slot 26 in the disk is offset from the axis of the disk in the opposite direction. This arrangement, however, is solely for the purpose of providing sufficient material in the pivot lugs 22 and 23 of the jaw 3 beyond the wedge surfaces 33 and 34 to afford adequate strength without unduly extending the pivot lugs beyond the pivot pin 15. The wedge action and the distribution of forces are the same with this arrangement, as though the pivot pin slot 26 and the wedge lugs 27 and 28 were centrally disposed on the disk 20.

Although I have shown and described what is now considered a preferred embodiment of the invention, it is apparent that various modifications may be made therein without departing from the spirit of the invention or the scope of the appended claims.

I claim:

1. In a pipe tong, the combination of a lever having a pair of spaced bores therein adjacent one end, first and second jaw members, a pivot pin engaging one of said bores and extending through aligned bores in said first jaw member for pivotally connecting it to the lever, a disk journaled in the other bore, said disk having a slot extending therethrough parallel to the disk axis and elongated in a direction transverse to the disk axis, a pin extending through said slot and engaging said second jaw member for mounting the latter on said lever for pivotal movement with said disk and for limited rectilinear movement relative to said disk and said lever, said disk having a projection thereon providing a wedge surface extending parallel to the direction of elongation of said slot, said second jaw member having a groove therein to receive said projection and providing a wedge surface opposed to and engaging said first-named wedge surface for transferring force from said lever to said second jaw member, and means for connecting the free ends of said jaw members together about a pipe.

2. In a pipe tong of the type comprising a lever, a series of pivotally interconnected jaws, the end jaws of the series being connected to said lever at spaced apart points whereby movement of the lever in one direction tightens the jaws about a pipe, the end jaws being so constructed and arranged that upon application of equal forces thereto by the lever, one of said end jaws exerts more pressure against the pipe than the other end jaw, the improvement comprising: a wedge surface on said one end jaw extending in a direction disposed intermediate the direction of applied force on said one end jaw by the lever and a line extending between said spaced apart points of connection of said end jaws to the lever, a member journaled in the lever and having a wedge surface thereon slidably engaging the wedge surface on said one end jaw, said interengaging wedge surfaces constituting the sole means for transmitting force from the lever to said one end jaw, whereby said force is divided into a first component force acting tangentially on said one end jaw to cause it to exert pressure against the pipe and a second component force transmitted through the lever to said other end jaw to augment the tangential force exerted by the lever on said other end jaw.

3. In a pipe tong of the type comprising a lever, a series of pivotally interconnected jaws forming a pipe opening therebetween and comprising end jaws and at least one intermediate jaw, one end jaw of the series being pivotally connected to the lever on a fixed pivotal axis, and the other end jaw being pivotally connected to the lever at a greater distance from said pipe opening than said fixed pivotal axis, the relative positions of said pivotal connecting points and the relative lengths of said jaws being such as to cause said other end jaw to normally exert greater pressure against the pipe than said one end jaw, the improvement comprising: a member rotatably mounted in the lever, slidably interengaging wedge surfaces on said member and on said other end jaw and constituting the sole means of transmitting force from the lever to said other end jaw, said wedge surfaces extending in a direction intermediate the direction of applied force from the lever to said other end jaw and a line extending between the points of pivotal connection of said end jaws with the lever, whereby the force exerted by the lever on said other end jaw is divided into a first component force acting tangentially on said other end jaw to cause it to exert pressure against the pipe and a second component force transmitted through said lever to said one end jaw to augment the tangential force exerted by the lever on said one end jaw.

4. In a pipe tong, the combination of a lever having a pair of spaced bores therein, first and second jaw members, a pivot pin engaging one of said bores and extending through aligned bores in said first jaw member for pivotally connecting it to the lever, a disk-like member journaled in the other bore, and having a projection thereon providing a flat wedge surface extending transversely of the member, said second jaw member having a groove therein to receive said projection and providing a flat wedge surface opposed to and slidably engaging said first-named wedge surface, said interengaging wedge surfaces constituting the sole means of transmitting force from the lever to the second jaw member, means for limiting relative sliding movement between said wedge surfaces, and means for connecting the free ends of said jaw members together about a pipe.

5. In a pipe tong, the combination of a lever having a pair of spaced bores therein, a first jaw member and a pivot pin extending therethrough and through one of said bores for pivotally connecting the jaw member to the lever, a second jaw member having a pair of spaced lugs embracing said lever and a groove in each lug providing a flat wedge surface, a disk-like member rotatably mounted in the other bore in the lever and having its end surfaces embraced by said lugs, and a projection on each end of said member each extending into a respective groove in said lugs and each having a flat wedge surface slidably engaging a respective wedge surface in said grooves, said interengaging wedge surfaces constituting the sole means of transmitting force from the lever to the second jaw member, means for limiting relative sliding movement between said wedge surfaces, and means for connecting the free ends of said jaw members about a pipe.

6. A pipe tong as set forth in claim 5, wherein the means for limiting relative sliding movement between said wedge surfaces comprises an elongated slot in said disk-like member and a pin extending through said slot and through aligned bores in said lugs.

CHESTER A. LUNDEEN.

REFERENCES CITED

The following references are of record in the file of this patent:

UNITED STATES PATENTS

| Number | Name | Date |
|---|---|---|
| 1,118,937 | Kibele | Dec. 1, 1914 |
| 1,747,605 | Smith | Feb. 18, 1930 |
| 2,209,988 | Matlock | Aug. 6, 1940 |
| 2,278,439 | Grau | Apr. 7, 1942 |
| 2,392,931 | Lundeen | Jan. 15, 1946 |